United States Patent [19]
Leutner et al.
[11] 3,769,087
[45] Oct. 30, 1973

[54] FERROMAGNETIC CHROMIUM DIOXIDE CRYSTALS

[75] Inventors: Bernd Leutner, Maxdorf; Matthias Schwarzmann, Lim-Burgerhof; Manfred Ohlinger, Ludwigshafen, all of Germany

[73] Assignee: Badische Anilin & Soda-Fabrik Aktiengesellschaft, Ludwigshafen/Rhine, Germany

[22] Filed: Apr. 18, 1972

[21] Appl. No.: 245,272

[52] U.S. Cl. ............ 117/234, 117/100 B, 117/235, 252/62.51, 423/607

[51] Int. Cl. ....................... C01g 37/02, H01f 10/02

[58] Field of Search.................. 252/62.51; 423/607; 117/234, 235, 100 B

[56] References Cited

UNITED STATES PATENTS

| | | | |
|---|---|---|---|
| 3,512,930 | 5/1970 | Bottier et al. | 252/625 X |
| 3,520,811 | 7/1970 | Swoboda | 117/234 X |
| 3,585,141 | 6/1971 | Ingersoll | 252/62.51 X |
| 3,586,630 | 6/1971 | Ingersoll | 252/62.51 X |
| 3,634,252 | 1/1972 | Graham | 117/235 X |
| 3,686,031 | 7/1972 | Balthis | 252/62.51 X |
| 3,687,726 | 7/1972 | Pye | 117/234 |
| 2,923,683 | 2/1960 | Ingraham | 252/62.51 |

*Primary Examiner*—Edward J. Meros
*Assistant Examiner*—J. Cooper
*Attorney*—Johnston, Root, O'Keeffe, Keil, Thompson & Shurtleff

[57] ABSTRACT

The invention relates to ferromagnetic chromium dioxide crystals which are particularly suitable as magnetic pigments for magnetic recording media and whose surface, for the purpose of stabilization, is protected with antimony or arsenic compounds which are sparingly soluble in water, and to a process for the production of chromium dioxide crystals thus stabilized by the precipitation of antimony or arsenic compounds which are sparingly soluble in water.

6 Claims, No Drawings

FERROMAGNETIC CHROMIUM DIOXIDE CRYSTALS

The invention relates to a process for stabilizing ferromagnetic chromium dioxide, stabilized ferromagnetic chromium dioxide crystals and their use for magnetic recording media.

It is known that chromium dioxide crystals having ferromagnetic properties can be used as magnetic pigments for magnetic recording media. They may be prepared by various methods, for example compounds of chromium and oxygen which are pure or which have been modified with metals and which have a ratio of oxygen to chromium of >2:1 may be thermally decomposed into chromium dioxide at superatmospheric pressure according to U.S. Pat. Nos. 2,923,683, 3,034,988 and 3,117,093 or German Printed Application No. 1,270,538 or at atmospheric pressure according to U.S. Pat. No. 3,486,851, or chromium oxides having a ratio of oxygen to chromium of 2:1, for example chromic oxide, may be oxidized with chromium trioxide or other oxidizing agents to form chromium dioxide (cf. U.S. Pat. No. 3,278,263).

The ferromagnetic properties of chromium dioxide may be favorably influenced by adding metals which occupy the spaces usually occupied by chromium in the crystal lattice of $CrO_2$. For example, according to German Printed Application No. 1,467,328 or German Pat. No. 1,152,932 selenium, tellurium, ruthenium, tin, antimony, titanium, vanadium,manganese, iron, cobalt or nickel may be introduced into the crystal lattice of chromium dioxide as modifying elements. It is also possible for spaces in the crystal lattice normally occupied by oxygen to be occupied for example by fluorine.

In the case of ferromagnetic chromium dioxide the chromium is present in the less stable oxidation stage of this element, namely +4. Chromium dioxide can therefore easily be converted into compounds of higher thermodynamic stability with the oxidation stages +3 and/or +6 and is consequently sensitive to reducing or oxidizing influences. It may even react with the organic compounds of the binder in magnetic recording media, particularly at elevated temperature and high humidity, with the subsequent loss of the magnetic properties. If no reducing or oxidizing agent is present, chromium dioxide may slowly disproportionate into trivalent and hexavalent chromium compounds so that some of the desired properties of chromium dioxide as a magnetic pigment are detrimentally affected.

German Printed Application No. 1,925,541 discloses that the chemical stability of acicular ferromagnetic chromium dioxide particles can be improved by reducing the surface of the particles so that a protective phase of a trivalent chromium compound is formed around the crystals. This however involves a waste of ferromagnetic chromium dioxide because, in order to achieve an adequate protective effect, a certain proportion of tetravalent chromium dioxide is reduced to trivalent chromium compound and thus lost as magnetic pigment.

We have now found that ferromagnetic chromium dioxide crystals, which may have been modified with a foreign element, are substantially resistant to chemical changes and thus retain their magnetic properties when the surface of the chromium dioxide crystals is protected with a sparingly water-soluble antimony or arsenic compound.

Ferromagnetic chromium dioxide crystals stabilized according to the invention are particularly stable when the amount of sparingly water-soluble antimony or arsenic compound (calculated as $Sb_2O_3$or $As_2O_3$) present on the surface of the crystals is about 0.5 to 15 percent of the weight of the chromium dioxide crystals. Stabilization according to the invention is not attended by a loss of chromium dioxide and of remanence.

A crystalline, predominantly acicular chromium dioxide is generally used as starting material for the stabilization according to the invention. Such a chromium dioxide can be prepared for example according to U.S. Pat. No. 3,278,263. Naturally, a chromium dioxide which has been modified with a foreign element, or a chromium dioxide which has been pretreated for example by a conventional method, such as by reduction of the surface, may also be used. It is essential that a ferromagnetic chromium dioxide which can be used for magnetic recording media should be subjected to the aftertreatment according to the invention.

A particularly simple and therefore preferred form of the stabilization according to the invention by applying an antimony compound which is sparingly soluble in water at about 20° to 50° consists in adding to a chromium dioxide precipitate an antimony trihalide, particularly antimony trichloride or antimony trifluoride or solutions of antimony trioxide and alkali metal halide in halogen hydracides, such as $Sb_2O_3$ and NaCl in HCl, a hydrolysis into antimony trioxide compounds being effected by maintaining a pH of about from 2 to 10, preferably from 6 to 8.

Not only can colloidally amorphous or crystalline antimony trioxide be used as the sparingly soluble oxygen compound of antimony, but also other sparingly soluble oxygen compounds of antimony such as $Sb_4O_5Cl_2$ and SbOCl.

The antimony compounds whose hydrolysis gives $Sb_2O_3$ may also be compounds of pentavalent antimony such as $SbF_5$or $SbCl_5$ if provision is made, by the presence of a reducing agent such as a sulfite, dithionite, phosphite, hydrazine and/or an alkali metal borohydride, that a reduction to trivalent antimony takes place without the chromium dioxide crystals being attacked.

In order to set up the pH and to complete the hydrolysis, it is advantageous to use basic compounds such as ammonium hydroxide solutions, alkali metal hydroxides, particularly aqueous solutions of 0.5 to 20 percent by weight of sodium or potassium hydroxide, alkali metal carbonates or, if desired, aqueous solutions of water-soluble organic amino compounds such as trimethylamine, dimethylamine, monomethylamine, triethylamine, diethylamine or monoethylamine.

It is preferred to use an amount of antimony compound, calculated as $Sb_2O_3$, of from 2 to 6 percent by weight of the chromium oxide used.

It is not necessary however that the precipitate should consist of $Sb_2O_3$ or an antimony oxide chloride. Sparingly soluble antimony sulfides or other sparingly water-soluble antimony compounds may be used to protect the surface of the chromium dioxide crystals. For example, antimony trisulfide or antimony pentasulfide may be applied to the chromium dioxide crystals by adding a soluble thioantimonite or thioantimonate such as sodium thioantimonite ($Na_3SbS_3$) or a thioantimonate such as sodium thioantimonate ($Na_2SbS_4.9H_2O$) to a suspension of chromium dioxide and slowly acidifying with a non-oxidizing acid, so that the sparingly soluble antimony sulfide is precipitated. Another method consists in treating chromium dioxide crystals, the surface of which has been protected with antimony trioxide, in a suspension with sulfide ions which have been introduced into the suspension for example as alkali metal sulfide or hydrogen sulfide gas. It is advantageous to use an amount of sulfide which corresponds to the complete conversion of the antimony trioxide ($Sb_2O_3$) into antimony sulfide ($Sb_2S_3$), a pH of 2to 9 being maintained. A slow and simultaneous introduction of stoichiometric amounts of a solution containing trivalent or pentavalent antimony ions and a solution containing sulfide ions into a chromium dioxide suspension is also possible, the pH of the suspension advantageously being kept within a range of from about 1 to about 9 with alkali or non-oxidizing acid.

Arsenic trisulfide or pentasulfide, deposited on the chromium dioxide in an analogous manner to antimony sulfides, also exhibits a good stabilizing effect.

In another very advantageous embodiment the surface of the chromium dioxide crystals is protected with silicic acid which is sparingly soluble in water in addition to the antimony trioxide compound. The amount of silicic acid (calculated as $SiO_2$) is advantageously from 0.5 to 30 percent of the weight of the chromium dioxide crystals. The silicic acid is advantageously separated from the aqueous phase as an amorphous hydrated substance so that it forms a coherent coating on the particles of magnetic pigment. This may be achieved for example by adding an alkali metal silicate and a mineral or organic acid to an aqueous suspension of chromium dioxide.

It is advantageous for an alkali metal silicate solution, particularly a waterglass solution, and an acid for example sulfuric, hydrochloric or acetic acid, to be added slowly and simultaneously to a suspension of chromium dioxide protected with a sparingly soluble antimony compound while stirring vigorously so that the pH of the suspension is within a range of from 1 to 9, preferably from 2 to 6. In a further embodiment the silicate solution and acid are added to a chromium dioxide suspension, which has been heated to 70° C or higher, in such a way that the pH of the suspension is always from about 8 to 11. Precipitation of silica gel is advantageously effected very slowly. Reaction periods (i.e., addition times) of from half an hour to several hours are necessary.

The silicic acid may be precipitated by means of alkalies instead of with acids, when starting from fluorosilicates. In this case hexafluorosilicic acid or a soluble salt thereof such as ammonium or sodium fluorosilicate which hydrolyzes at a pH of from about 4 to 9 are advantageously used. Silicic acid precipitated in this way may also contain small traces of fluorine without the stabilizing effect being detrimentally affected. The sequence in which the sparingly soluble compounds are precipitated in the precipitation of antimony compounds and silicic acid on chromium dioxide crystals is not important. Both the antimony compound and the silicic acid may be deposited as a first protective layer on the chromium dioxide crystals. The amount of silicic acid deposited on the chromium dioxide crystals is preferably from 2 to 6 percent by weight of the chromium dioxide used. Electron micrographs show that in the case of chromium dioxide stabilized according to the invention the structure of the chromium dioxide crystals is retained and their surface is at least partly, if not wholly, coated.

As compared with unstabilized ferromagnetic chromium dioxide crystals conventionally used, the ferromagnetic chromium dioxide stabilized according to this invention is distinguished by much greater stability and by a substantially decreased release of chromate, which was ascertained as follows:

To control the effectiveness of the stabilization in each case 1 g of stabilized chromium dioxide crystals are shaken at 55° C with 15 ml of distilled water and in each case the amount of chromate in the water was determined after 1, 3 and 6 hours. The analytical method used to ascertain the amount of chromate was a colorimetric determination using diphenyl carbazide or, in the case of higher concentrations of chromate, a potentiometric titration with ferric sulfate solution (cf. Handbuch der analytischen Chemie, Volume VI bα, Chromium, W. Fresenius and G. Jander, Springer-Verlag, Berlin, 1958).

In this treatment an unstabilized chromium dioxide gives a yellow solution which contains about 80 mg of $CrO_3$ per liter after 1 hour, about 130 mg of $CrO_3$ per liter after 3 hours and from 170 to 280 mg of $CrO_3$ per liter after 6 hours.

Chromium dioxide stabilized according to the invention may be used as the magnetic component for the production of recording tapes, discs and drums and for magnetic memory cores. In high frequency technology it may be used for attenuators, gyrator elements, electrically operated switches and low loss transformer cores. Other fields of application include focussing magnets, magnetic clutches and thermal-magnetic copying equipment. In all these applications chromium dioxide which has been treated according to the invention exhibits better chemical and ferromagnetic stability than untreated material.

Magnetic recording media may be advantageously prepared with the stable ferromagnetic chromium dioxide according to the invention by conventional methods using prior art binders. Examples of suitable binders are polyurethanes prepared from polyesters containing hydroxyl groups or vinyl chloride or acrylic ester copolymers containing hydroxyl groups and polyisocyanates, copolyamides, copolymers of vinyl chloride and vinyl acetate or vinyl propionate and, if desired, vinyl alcohol, copolymers of vinylidene chloride, for example with vinyl chloride, vinyl acetate, acrylonitrile and/or acrylic esters or mixtures of these binders. Lubricants and other additives may also be used in these recording media. Other suitable additives are specified for example in U.S. Pat. No. 2,418,479.

In the following Examples a chromium dioxide powder is used which, prior to stabilization, has a sigma value of 820 gauss $cm^3/g$. and a coercive force of 480 oersteds. Unless otherwise specified, the chromium dioxide is made into a suspension with water in a ratio of about 1:20 and mixed for about 5 to 10 minutes in a Ultra-Turrax disperser (manufactured by Janke and Kunkel, Staufen, Germany) to improve suspension. After the pigment has been stabilized, it is filtered off, washed with water and dried at 30° to 120° C and advantageously at subatmospheric pressure, for example at 15 to 30 mm Hg.

The parts and percentages specified in the following Examples are by weight unless otherwise specified.

EXAMPLE 1

An aqueous solution of antimony trichloride (8 parts of $SbCl_3$, 1 part of water) in which by calculation 36 g of antimony trioxide ($Sb_2O_3$) is present is uniformly metered in the course of 10 minutes into a suspension of 1 kg of chromium dioxide in 13.2 liters of water with vigorous mixing in a Turrax disperser. The pH is then adjusted to 7.0 with 10 percent ammonium solution, dispersed again for a short time and filtered. The stabilized chromium dioxide is washed and dried at 60° C and 20 mm Hg. Only 46 mg of chromium trioxide per liter is released after 6 hours in the chromate test.

The same result is achieved by using antimony trifluoride (instead of antimony trichloride) which is added in powder form to the chromium dioxide suspension in the experiment. Solutions of $Sb_2O_3$ and alkali metal halides in hydrochloric acid are equally effective. A solution of 100 g of $Sb_2$ $O_3$ and 80 g of NaCl in 175 ml of 12.4-normal hydrochloric acid and 160 ml of water is also very suitable.

EXAMPLE 2

A solution of antimony trichloride containing 12.5 g of $Sb_2O_3$ is slowly added with vigorous stirring to a suspension of 250 g of chromium dioxide in 2.5 liters of water in the course of ten minutes. A pH of 3.0 is set up by adding 2 -normal caustic soda solution. Then a solution of ammonium hexafluorosilicate is added which has been prepared by neutralizing 80.0 g of a 31.8 percent aqueous solution of fluosilicic acid ($H_2SiF_6$) with 10 percent aqueous ammonia solution. To hydrolyze the hexafluorosilicate the pH is raised in the course of five minutes to 7.5 with 10 percent ammonia solution and the stabilized chromium dioxide is suction filtered give to fifteen minutes later.

In the chromate test only 25 mg of chromium trioxide per liter is released after 6 hours. Electron micrographs (magnification: 80,000 x) clearly show that the crystals are covered with a coherent coating.

EXAMPLE 3

A solution of antimony trichloride containing 12.5 g of $Sb_2O_3$ is added to a suspension of 250 g of chromium dioxide in 5 liters of water in the course of ten minutes with vigorous stirring. 250 g of a waterglass solution with 26 percent of $SiO_2$ and a ratio of $SiO_2$ to $Na_2O$ of 3.28:1 is then added in the course of ten minutes. The pH is adjusted to 7 with 2-normal sulfuric acid followed by suction filtration and drying. The stabilized chromium dioxide releases only 18 mg of $CrO_3$ per liter in the six-hour chromate test.

EXAMPLE 4

20 ml of a solution of solium thioantimonite (prepared by dissolving 2.5 g of antimony trisulfide ($Sb_2S_3$) with the stoichiometric amount of sodium sulfide) is added uniformly in the course of twenty minutes to a suspension of 50 g of chromium dioxide in 0.5 liter of water. The pH of the suspension is kept at 4 with 1 -normal sulfuric acid during the addition of the thioantimonite so that precipitation of antimony trisulfide is achieved.

The chromium dioxide thus stabilized releases less than 10 mg of $CrO_3$ per liter in the six-hour chromate test. The same favorable result is achieved when antimony trisulfide is precipitated on chromium dioxide from a solution of an alkali metal antimonite by means of hydrogen sulfide or an alkali metal sulfide.

EXAMPLE 5

A suspension of 50 g of chromium dioxide in 0.5 liter of water is adjusted to pH 6 with caustic soda solution and a solution of 5.7 g of sodium thioantimonate (v) ($Na_3SbS_4.9H_2O$) in about 50 ml of water is added. The pH is adjusted to 2 in the course of 15 to 30 minutes with about 7 g of 6.3-normal hydrochlroic acid to precipitate antimony sulfide and the chromium dioxide is suction filtered, washed with water and dried.

The stabilized chromium dioxide releases less than 10 mg of $CrO_3$ per liter in the 6-hour chromate test.

EXAMPLE 6

A solution of 4 g of sodium thioarsenate (V) ($Na_3AsS_4.8H_2O$) in 40 ml of water is added to a neutral suspension of 50 g of chromium dioxide in 0.5 liter of water and immediately thereafter the whole is adjusted to a pH Of about 2 to 4 in the course of 10 minutes to precipitate arsenic sulfide.

The stabilized chromium dioxide, which has been washed and dried, releases less than 10 mg of $CrO_3$ per liter in the 6-hour chromate test.

EXAMPLE 7

A magnetic tape is prepared by a conventional method using a chromium dioxide pigmestabilized according pigment Example 5. The binder for the pigment is a soluble reaction product of a hydroxylcontaining polyester derived from adipic acid and 1,4-butanediol with 4,4'-diisocyanato-diphenylmethane dissolved in a mixture of equal parts by volume of tetrahydrofuran and toluene. The base film is made of polyethylene terephthalate. The thickness of the magnetic coating is 5 microns.

62.5 $cm^2$ of this magnetic tape is shaken for eight hours with distilled water at a temperature of 70° C. The $CrO_3$ content of the aqueous solution (determined by the abovementioned colorimetric method) is less by a factor of more than 25 than the $CrO_3$ contents of comparative solutions obtained with magnetic tapes having untreated chromium dioxide as the magnetic pigment.

We claim:

1. A ferromagnetic composition consisting essentiallY of chromium dioxide substantially coated with 0.5 to 15 percent by weight of an oxygen or sulfur containing antimony or arsenic compound, said compound being substantially insoluble in water at 20 to 50° C., said amount being calculated as $Sb_2O_3$ or $As_2O_3$ with reference to said chromium dioxide.

2. A ferromagnetic composition as set forth in claim 1, wherein the antimony or arsenic compound iS an oxide or sulfide of antimony or arsenic.

3. A ferromagnetic composition as set forth in claim 1, wherein the ferrogmanetic composition is coated with a mixture of said antimony or arsenic compound and amorphous silicic acid, said silicic acid being present in an amount of 0.5 to 30 percent weight based on the weight of said chromium dioxide, calculated as $SiO_2$.

4. A ferromagnetic composition a set forth in claim 3, wherein the amount of amorphous silicic acid is 2 to 6 percent by weight of the chromium dioxide, calculated as $SiA_2$.

5. A ferromagnetic composition as set forth in claim 1, wherein the coated ferromagnetic composition is additionally coated with amorphous silicic acid in an amount of 0.5 to 30 Percent by weight of the ferromagnetic composition, calculated as $SiO_2$.

6. A magnetic recording medium which comprises: a base and a magnetizable layer, said magnetizable layer containing a ferromagnetic composition as set forth in claim 1.

* * * * *

UNITED STATES PATENT AND TRADEMARK OFFICE

CERTIFICATE OF CORRECTION

PATENT NO. : 3,769,087

DATED : October 30, 1973

INVENTOR(S) : Bernd Leutner, Matthias Schwarzmann, and Manfred Ohlinger

It is certified that error appears in the above-identified patent and that said Letters Patent are hereby corrected as shown below:

Column 1, in the heading, insert--[30] Foreign Application priority Data, April 23, 1971, P 21 19 932.6--;

Column 2, line 28, delete "hydracides" and substitute--hydracids--;

Column 6, line 10, delete "hydrochlroic" and substitute--hydrochloric--;

Column 6, lines 29-30, delete "pigmestabilized according pigment" and substitute--pigment stabilized according to--;

Column 6, line 47, delete "essentiallY" and substitute--essentially--;

Column 6, line 56, delete "iS" and substitute--is--;

Column 6, line 59, delete "ferrogmanetic" and substitute--ferromagnetic--;

Column 6, line 68, delete "$SiA_2$" and substitute --$SiO_2$--.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*